W. H. WATKINS.
TRAP.
APPLICATION FILED JUNE 15, 1909. RENEWED JAN. 14, 1911.

995,207.

Patented June 13, 1911.

Witnesses
William E. Linton.
Wm. Roerth

Inventor
William H. Watkins.
By Victor J. Evans
Attorney

UNITED STATES PATENT OFFICE.

WILLIAM H. WATKINS, OF NILES, OHIO.

TRAP.

995,207. Specification of Letters Patent. Patented June 13, 1911.

Application filed June 15, 1909, Serial No. 502,339. Renewed January 14, 1911. Serial No. 602,691.

*To all whom it may concern:*

Be it known that I, WILLIAM H. WATKINS, a citizen of the United States, residing at Niles, in the county of Trumbull and State of Ohio, have invented new and useful Improvements in Traps, of which the following is a specification.

This invention relates to traps, and is primarily directed for use in connection with insects or small animals, and the object of the invention is to provide a device of this character which is extremely simple in construction, easily manufactured and which can be produced at a small cost.

With the above and other objects in view, which will appear as the description progresses, the invention resides in the novel construction of traps hereinafter fully described and claimed.

Figure 1:
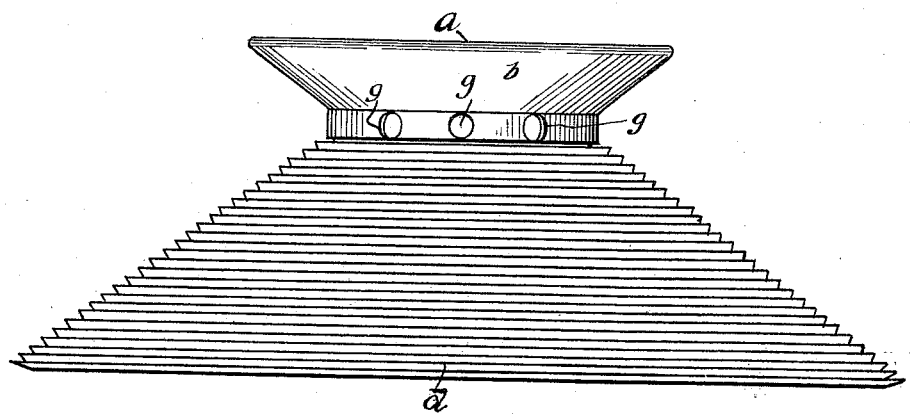
Figure 2:
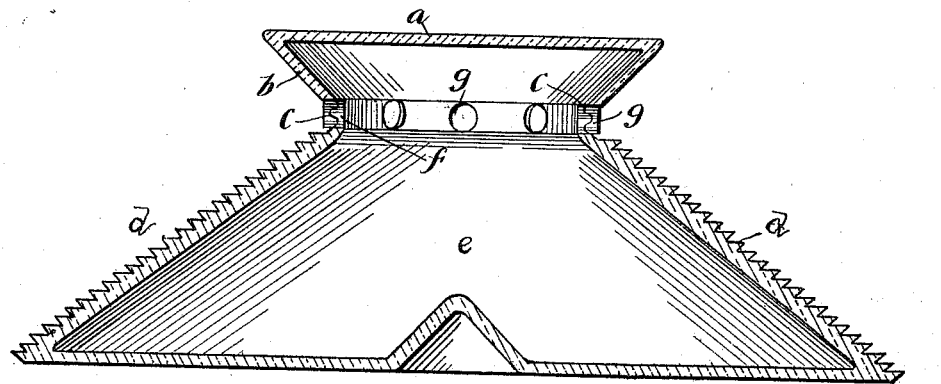

In the accompanying drawings, Figure 1 is a side elevation of a trap constructed in accordance with the present invention. Fig. 2 is a sectional view of the same.

In the accompanying drawings, $a$ designates the top of the device. This top $a$ is constructed of some smooth material and is downwardly inclined as at $b$ and has its rear wall threaded as at $c$. The lower compartment $e$ has its outer walls inclined in opposite directions to that of the hood portion $b$ and the outer faces of the said inclined portions are serrated as at $d$ to provide a footing for the animal or insect to be trapped. The upper portion of this compartment $e$ substantially V-shaped in cross section is provided with an upstanding collar $f$ and this collar is provided with a plurality of peripheral openings $g$ which are adapted to serve as an entrance for the said insects or animals. The collar $f$ is also provided with threads upon one of its faces which are adapted to engage with the thread $c$ of the upper compartment, and whereby the two compartments are removably connected together. These devices are also constructed of suitable transparent material and have their inner walls smooth and of a slippery nature so that it will be impossible for the animals or insects to climb the said walls and to escape through the openings $g$ through which they enter. It will be noted that by constructing the trap of a pair of sections the upper member may be easily separated from the lower member and the animals or insects easily removed from the trap.

From the above description, taken in connection with the accompanying drawings, it will be noted that I have provided a comparatively simple and inexpensive device for the purpose intended and one which will perform the purposes for which it is designed with accuracy and assurance.

Having thus described the invention what I claim as new is:—

1. A trap of the character described, comprising a receptacle constructed of transparent material having its inner walls smooth and slippery, said trap having its outer walls inclined and serrated, the top portion of the trap being inclined outwardly and the portion of the trap between the serrated inclined walls and the outwardly inclined trap being provided with a plurality of entrance openings.

2. A trap for the purpose set forth, comprising a substantially cone-shaped lower member, said lower member having its inner walls smooth and slippery and its outer wall serrated, the upper portion of the said member being open and being provided with threads, a cap member for the lower member, said cap member comprising a hollow inverted cone-shaped element having its lower extremity provided with threads adapted to engage with the threads of the lower member and the threaded portions of both the members being provided with openings, substantially as and for the purpose set forth.

In testimony whereof I affix my signature in presence of two witnesses.

WILLIAM H. WATKINS.

Witnesses:
 EARL NESLINE,
 R. J. HAYNES.

Copies of this patent may be obtained for five cents each, by addressing the "Commissioner of Patents, Washington, D. C."